United States Patent [19]

Guevel et al.

[11] Patent Number: 5,024,396
[45] Date of Patent: Jun. 18, 1991

[54] AIR OR SUBMARINE ENGINE WITH IMPROVED CONTOUR

[75] Inventors: Pierre M. Guevel, Chateauneuf de Grasse; Philippe R. Bardey, Mougins, both of France

[73] Assignee: Principia Recherche Developpement SA, Valbonne, France

[21] Appl. No.: 489,746

[22] Filed: Feb. 26, 1990

Related U.S. Application Data

[63] Continuation of Ser. No. 220,909, Jul. 19, 1988, abandoned, which is a continuation-in-part of Ser. No. 876,764, Jun. 20, 1986, abandoned.

[51] Int. Cl.$^5$ .......................... B64C 3/14; B63G 8/00
[52] U.S. Cl. .................................. 244/35 R; 114/274; 114/312
[58] Field of Search ............. 244/35 R; 114/274, 312, 114/339

[56] References Cited

U.S. PATENT DOCUMENTS

| 817,130 | 4/1906 | Naletoff | 114/339 |
| 2,562,227 | 7/1951 | Zobel | 244/35 R |
| 3,946,688 | 3/1976 | Gornstein et al. | 114/274 |
| 4,652,213 | 3/1987 | Thibert et al. | 244/35 R |

OTHER PUBLICATIONS

"Theory of Wing Sections", I. H. Abbott and A. E. von Doenhoff, Dover Publications, Inc., NY, 1949, pp. 73 and 328.

Primary Examiner—Joseph F. Peters, Jr.
Assistant Examiner—James M. Kannofsky
Attorney, Agent, or Firm—Frishauf, Holtz, Goodman & Woodward

[57] ABSTRACT

A reduced-drag, axially symmetrical missile or submarine hull with rounded, tapered bow and stern portions, and a rounded central portion tapered, for drag minimization, along a curve defined by a Fredholm equation of the second kind framed so that the pressure coefficient remains constant at all points on the central portion. The missile is designed to travel within a fluid so that its drag coefficient is decreased, boundary layer detachment is avoided, and cavitation and instability phenomena are eliminated. The constant pressure coefficient is reached by following as a profile the natural track lines of the front portion which are joined to the rear portion.

3 Claims, 3 Drawing Sheets

AIR OR SUBMARINE ENGINE WITH IMPROVED CONTOUR

This application is a continuation of application Ser. No. 220,909, filed July 19, 1988, now abandoned, which was a continuation-in-part of Ser. No. 876,764, filed June 20, 1986, now abandoned.

This invention relates to a new kind of axisymetrical missile designed to travel within a fluid, such as water or air under not yet realised efficiency conditions.

BACKGROUND

Such travel can be understood as well horizontally as vertically. Thus, the missile according to the invention can be applied in submarine horizontal movement, for example for heavy transportation over long distances, such as submarine tanks. Otherwise, it can be used in vertical submarine movement, for example by sending ground receiver or penetrometers or the imersion and the hiding in the ground of industrial wastes. This missile can also be used in the design of air transportation vehicles such as airships, or missiles the path of which is approximately vertical such as rockets or similar devices.

The objective for such missiles is essentially the obtaining of high velocities, much higher to those of known devices for the same applications at a comparable weight, dimension and power. In addition, the missiles according to the invention have additional properties, such as stability, manuverability and absence of noise.

It is well known that, for such devices which are intended to move in a fluid, the shape of the front portion and of the rear portion are determined by technological considerations limited to the applications for which these missiles are designed. Thus, the front part can be pointed for the penetration, or round to shield receiver equipment (antennas, etc.) while the rearward shape is prescribed by considerations of motorization and stability involving optionally small wings, propellers, and systems for unwinding cables, etc.

On the other hand, most frequently, for reasons of simplicity, the front portion and the rear portion are united by a central cylindrical portion. The consequence of this configuration is to involve a high coefficient of drag (Cx) about 0.20, and detachement of the boundary layer which brings about instabilities, loss of action of the control surfaces, existence of cavitation phenomena involving lowering of the performance and increased noise.

This invention consists in substituting this cylindrical portion with a joining portion which profile is designed so that the pressure coefficient is in accordance with the most adapted law, according to the specificities of the missile. According to a preferred embodiment of the invention, for which the present specification is written, the profile is designed so that the pressure coefficient is practically constant over the length of this profile.

For this purpose, the invention consists in determining and following a profile, so that for the front portion of a given shape, the natural wake lines of the foresaid front portion form the front profile which is joined to the imposed rear portion, in such a manner that the coefficient of pressure remains constant at all points of the joining portion.

It should be observed that studies covering the design of profiles having approximatively constant pressure coefficient over an imposed section were previously made.

Thus, Ira H. ABBOTT, the NASA Director, ("Theory of Wing Sections", Dover Public inc., NY, 1949, pages 73 and 328) disclosed a method of optimization of a thin profile portion in order to obtain an ideal lift coefficient over this portion. But this method is based on a linear distribution of singularities like vortex, i.e. on the linearized theory of wings, referred, due to the linearization, to their mean lines, equidistant from the upper surfaces and the lower surfaces of the profile.

Then, these profiles are calculable by the well known theory of the functions of the compound variable and particularly by mean of the conformal mapping, as described by GORNSTEIN in U.S. Pat. No. 3,946,688.

However, such a method can only be applied to thin profiles and plan flows, and not axisymetrical profiles. Indeed, the thin circular stripes of the vortex over an axisymetrical body can not be reduced according to this theory in an element, the measurement of which is zero. Should someone wish to extrapolate, it should be necessary to use an uniform distribution of the normal doublets on the centered disks, which would not permit factoring in the previously cited constraints for the missiles according to the invention, namely

- the previously defined shape of the front and rear portions, and,
- a constant pressure on the portion joining the front and the rear portions.

THE INVENTIONS

The criterion of optimization in the frame of the invention is consequently the reducing of the drag strains, and not the increase of the lift as in the previously cited method, which is nonsense for an axisymetrical body, which has no lift.

In this case, according to the invention the total drag is practically reduced to the one of the plan plate of same wet surface, so that the drag coefficients Cx of the missiles so optimized are about 0.10.

The process according to the invention is based on a new calculation method, adapted to the above cited purpose. This method can not be based on analytical calculations specific of the use of the properties of the compound variable excluding as a consequence:
- the hypotheses of linearization of ABBOTT,
- the possibilities of the analysis as taken from GORNSTEIN,
- and the criterions of optimization based on the lift properties, free of any meaning for an axisymetrical body.

The method on which the invention is based consists in determining a distribution of singularities, kinematically equivalent to the moving body, constituted by normal doublets distributed over the real hull.

The solution is given by a non-linear equation of Fredholm of the second kind, resolved by a continual approach method.

The employed algorithm is absolutely convergent due to the joining conditions, front shape + joining portion/joining portion + rear shape, which were the object of a local asymptotical joining analysis.

The pressure gradients of the so obtained profile are, over the joining portion, identical with those of a plan plate oriented in the flow of the wind.

The adopted orientation of optimization involves the following results, proved by way of experiment: the drag coefficient is practically equal to the one of the plan plate having the same wet surface, and there is a lack of cavitation phenomena, even for high velocity navigation under the surface.

From a practical point of view, it results in a practically total lack of turbulence, cavitation phenomena, instabilities and noise. The flow backwards being sound, the controls remain efficient and the top velocity is at a very high level likely to reach, for a determined missile, 1.5 times the value which was previously known for this kind of missile.

BRIEF FIGURE DESCRIPTION

DETAILED DESCRIPTION

From a mathematical point of view, the problem to be solved is the following:

Taking into consideration an axisymetrical solid having an axis Ox, the front and rear shapes ($\gamma$ AV) and ($\gamma$ AR) of which are determined, the shape ($\gamma$) of the central portion joining the front and rear portions is sought, so that the pressure coefficient Cp remains constant in all point of this central portion.

If it is considered that this solid is propelled with an uniform translatory movement, the velocity of which is:

$$\vec{V_o} = Vo \cdot \vec{x}$$

the pressure coefficient Cp is expressed by the relation:

$$Cp = 1 - \left(\frac{Vr}{Vo}\right)^2$$

wherein Vr=relative speed of the fluid over the solid.

The result is that the sought constancy condition, $$Cp = \text{const., over } (\tau),$$

is equivalent to $$Vr = V1, \text{ over } (\tau),$$

V1 being an unknown constant at first sight.

Therefore, it can be considered that the problem posed consists in determining:

the equation y=y (x) of the element ($\tau$) of the profile's meridian, the potential function of the relative movement $$\Phi = \Phi(x, y)$$

the value of the constant V1.

The problem is in this case reduced to a set of the following equation:

$$\Delta\Phi = 0, \quad (1)$$

in the fluid, assumed to be endless in any directions, $$\frac{\delta\Phi}{\delta nV} = 0 \text{ over } (\tau AV + \tau + \tau AR); \quad (2)$$

$$|\text{grad } \Phi| = V1, \text{ over } (\tau); \quad (3)$$

$$\text{grad } \Phi = -Vo \, x, \, ad \text{ infinitum.}$$

The chosen method of calculation consists in engendering the potential $\Phi$ by way of a distribution of superficial singularities of normal doublets distributed all over the surface of the hull with the density:

$$\mu = -\Phi, \quad (5)$$

$\Phi$ showing the trace of the potential $\Phi$ (x, y) over this surface of hull.

Figure 1:
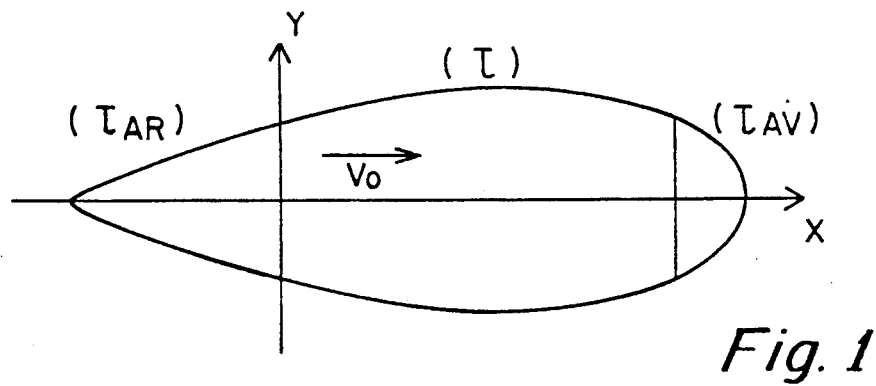
FIG. 1 illustrates schematically an ovoidal hull with bow portion $\tau AV$ and stern portion $\tau AR$.

Such a distribution of singularities creates within the body a field of velocities Vo x of the dragging movement (FIG. 1).

This specific property of superficial distribution of normal doublets allows to determine the density of these doublets by setting:

$$\Phi i = Vo (x - xo), \quad (6)$$

in all points of a closed arbitrary curve ($\tau$i), drawn in a meridian plan within the body; xo being an unknown constant at first sight.

Figure 2:
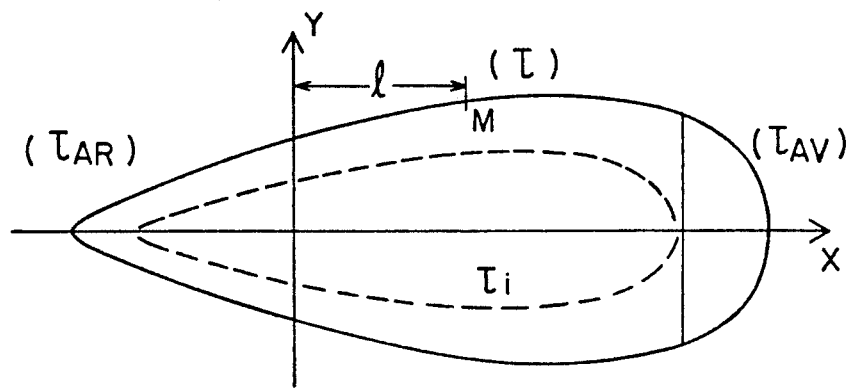
FIG. 2 illustrates an arbitrary closed curve drawn on a hull.

By another way, the condition (3) and the relation (5) imply:

$$\mu(l) = V1 \, l, \text{ over } (\tau), \quad (7)$$

l being the curvilinear abscissa of a current point of ($\tau$), positively counted in the direction of the x-axis, from the rear extremity of the central portion ($\tau$) (FIG. 2).

It results from the above comments that the problem posed to the limiting values defined in (1), (2), (3), (4) can be amended to an integral problem, the solution of which is given by the integral non-linear equation:

$$\int_{(\tau AV + \tau AR)} \mu(M')D(M,M')dS(M') +$$

$$V1 \int_{(\tau)} l (M')D(M,M')dS(M') =$$

$$Vo(x - xo), \forall M\epsilon(\tau i)$$

wherein:

$$D(M,M') = -\frac{1}{2\pi} \vec{n}(M') \cdot \text{grad}M'\left(\frac{1}{MM'}\right), \quad (9)$$

and wherein the unknowns are:
the values of $\mu$ over ($\tau AV$) and ($\tau AR$);
the ordinates y=y(x) over ($\tau$);
the values of the constants V1 and xo.

Substituting the profile's meridian by a polygonal line comprising N segments sj, the following set of equations, close to the integral equation, is obtained:

$$\sum_{j=\lambda}^{N} \lambda_j Dij = Vo(xi - xo), i = 1, 2, \ldots N, \quad (10)$$

wherin:

$$\begin{cases} \lambda j = \mu j, \text{ for } sj\epsilon(\tau AR + \tau AV) \\ \lambda j = Vl j, \text{ for } sj(\tau), \end{cases} \quad (11)$$

D ij designating the influence coefficient of a thin strip of normal doublets, with a unit density, based on the extremities of the segment sj (these influence coefficients become understood from the complete elliptic line and volume integral).

The set (10) comprises N equations of (N+2) unknowns; and in order to make it collocative, two additional relations obtained by choosing—further to a local analytic expansion—the geometrical shape of ($\tau$) near each end were added.

It should be observed that a previous theoretic study showed that it is not possible to choose simultaneously the shapes ($\tau$AV), ($\tau$AR) and the length of the joining portion ($\tau$), except for an amphidromic profile.

Figure 3:
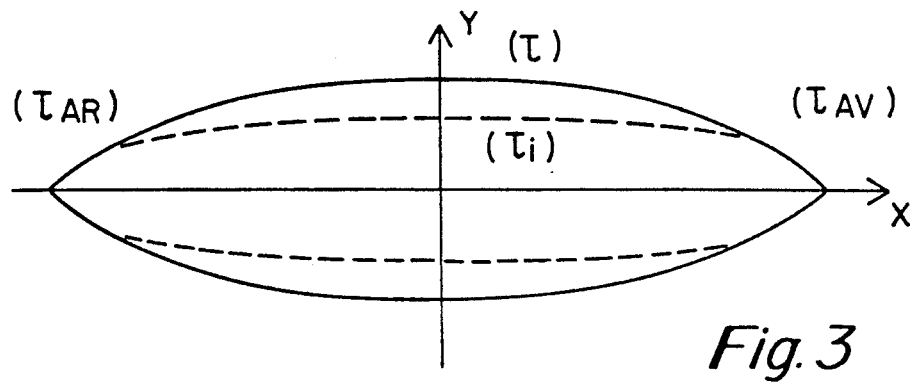
FIG. 3 illustrates a hull with an amphidromic profile.

For the clearness of the study, the difficulty will be temporarily eluded, when describing the chosen method to solve the problem of an amphidromic profile (FIG. 3).

Given an arbitrary shape ($\tau$o), plausible, of the sought joining portion ($\tau$).

The influence coefficients D ij of (10) are unknown for sj $\epsilon$ ($\tau$); on the other hand, they can be approximately expressed by the following relation:

$$(D\ ij) = (D\ ij)_{\tau o} + (\Delta ij)_{\tau o} Mj, \quad (12)$$

Mj being the difference between the coordinate of the sought curve ($\tau$) and the coordinate of the beginning curve ($\tau_o$).

Substituing in (10), a linear set of N equations with N+2 unknowns is obtained, completed by the two additional equations, which are also linear, obtained by the local analytic expansion of ($\tau$) near its two extremities.

The solution of the complete linear set of N+2 equations of N+2 unknowns give particularly a shape ($\tau$1), more close to the sought shape ($\tau$) as the beginning shape ($\tau$o).

The calculation are made again from the shape ($\tau$1), generating a new shape ($\tau$2) and so on as far as the shape ($\tau$n) coincides pratically with the shape ($\tau$n−1).

Figure 4:
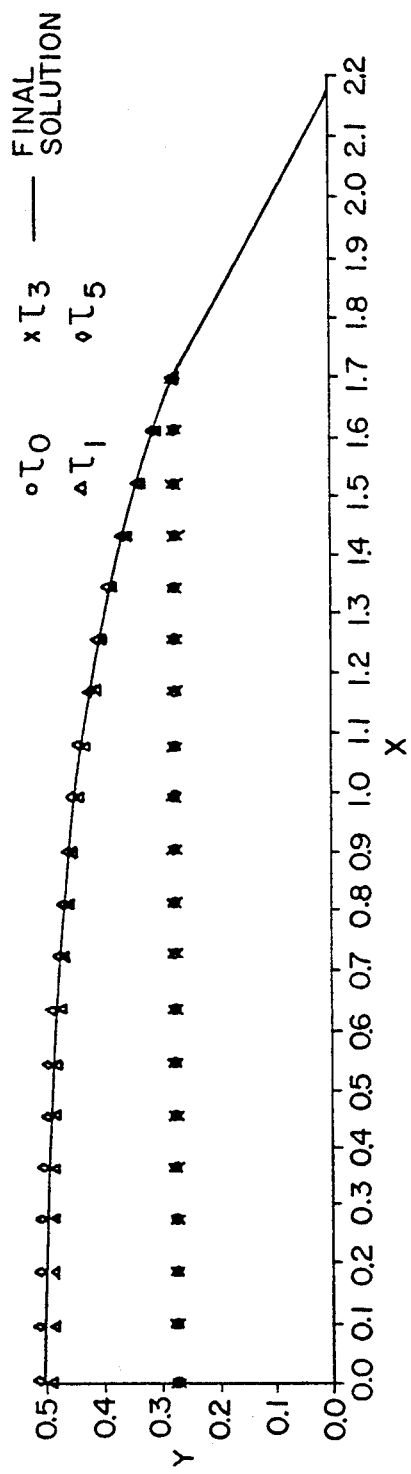
FIG. 4 illustrates the convergence of iterations of the approximating equations used in the present invention.
Figure 5:
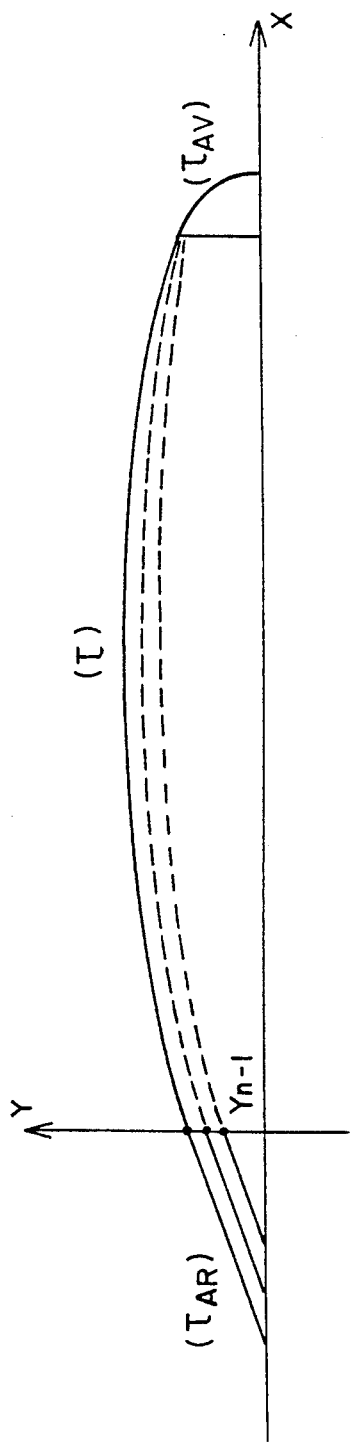
FIG. 5 illustrates the calculation of stern shape according to the present invention.

The convergence of the iterative operation is very fast, as it is shown on FIG. 4, showing the development of the shapes ($\tau$n) during different iterations in the case of an amphidromic body, the extremities of which are two identical cones having an angular extent of 60°.

If the front and rear shapes are different, the problem becomes complicated because the length of the joining portion is to be considered as an unknown; the difficulty can be solved in two stages.

FIRST CALCULATION

Given the arbitrary length L.
($\tau$A) must be an affine curve of the sought length.

The calculations are made as in the previous case, the ordinate Y of ($\tau$) at the rear extremitiy determinating then a new shape ($\tau$AR), resulting from the previous by an affinity, the ratio of which being $$\frac{Yn}{Yn - 1}$$

(FIG. 5).

SECOND CALCULATION

If the size of ($\tau$AR) are too different from the sought size, the length L is modified and a new iterative process is begun.

When the shape of the complete missile is determined, one is ensured that it has the prescribed properties when running a calculation program about the problem of a solid propolled with a translatory movement in a boundless medium.

Note

The optimization criterion of the portion ($\tau$) is:

$$Cp = \text{const.}$$

which seems to be the most judicious.

All of the elaborated calculation programs allow to take in consideration any law Cp (l). The result is:

$$Vr = Vr(1) = Vo\sqrt{1 - Cp(1)}$$

so that the formula (7) can easily be replaced by the following $$\mu(1) = \int_o^e Vr(1) dL$$

The two examples appearing hereafter illustrate the reduction into practice of the invention in two cases which are appreciably different from one another.

EXAMPLE 1

This example illustrates the case of an amphidromic missile (with identical extremities).

Figure 6:
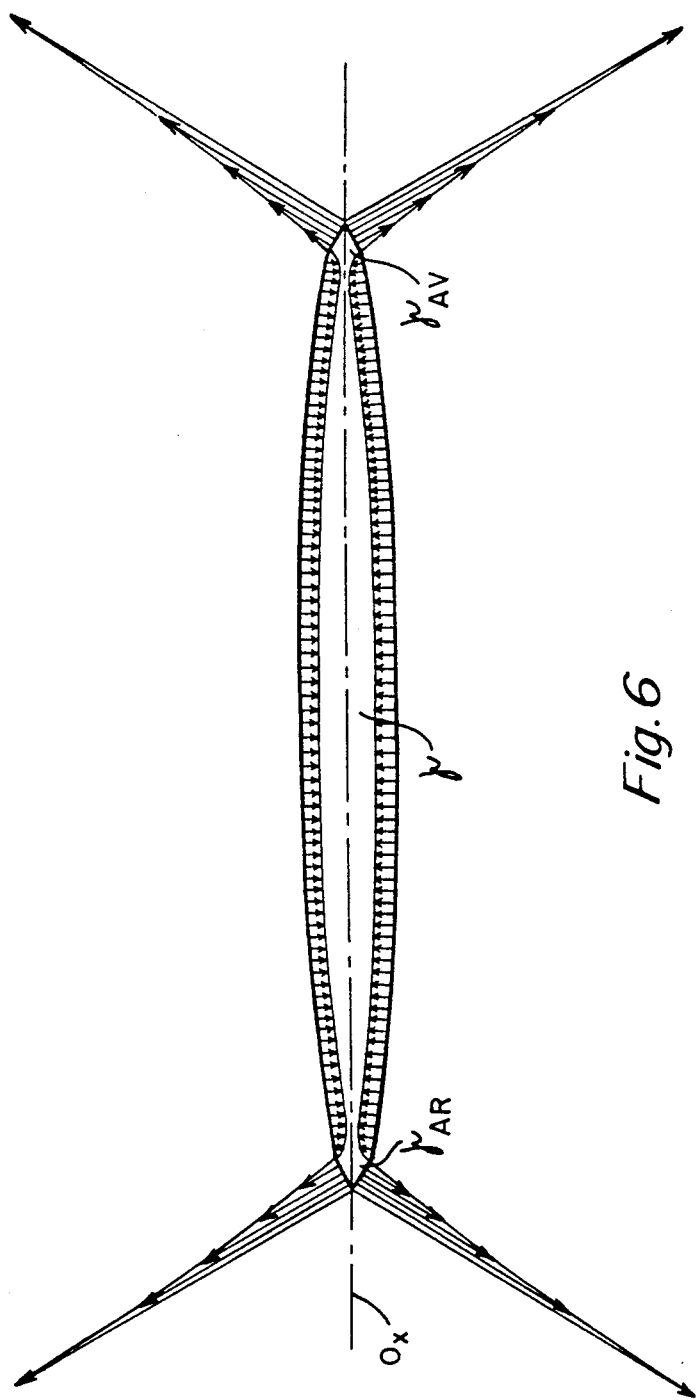
FIG. 6 illustrates Example 1, the case of a hull with identical extremities.

In this case, the solid has the shape presented in FIG. 6 and comprises two identical cones which are open at 60°, joined by a meridian shape $\tau$. For a length of 3.6 m and a diameter of 0.36 m and a mass of 2t, the maximal speed is 62 m/sec, with the distribution indicated by arrows of hydrodynamic pressures, i.e. approximately equal over the entire joining portion; in this case, one obtains:

$$V1/VO \sim 1.01, \text{ and consequently } (Cp) \text{ min} = -0.02$$

ensuring practically the lack of cavitation, until reaching a speed of the missile about 100 m/sec or more.

Tests performed in a tank with a model at a scale 1:3 gave the following results for the Cx values:

$$Cx = \begin{matrix} 0.1255, \text{ for } Re = 3.2 \times 10^6 \\ 0.1245, \text{ for } Re = 4.8 \times 10^6 \\ 0.1225, \text{ for } Re = 6.4 \times 10^6 \end{matrix}$$

Re being the Reynolds number.

This values are substantially equal to 1.14 times the frictional drag estimated in accordance with the Schoenherr formula.

The extrapolation of the results of the actual tests to the foresaid missile in accordance with the similarity techniques usually utilized (Re=$1.4 \times 10^8$) leads to: Cx=0.08 in a "hydraulically smooth" mode of operation.

By multiplying this value by 1.25 to take into consideration the effects of the roughness of the surfaces, one finally obtains: Cx=0.10 which is 40% less than the majority of devices which are presently used.

Such a missile reaches a maximal speed of 62 m/sec at a depth of 800 m, whereas comparable present missiles reach a maximal speed of only 50 m/sec.

EXAMPLE 2

This example illustrates the case of a missile with a rounded front, prefiguring the aerial devices with flat head, in which measuring instruments can be adapted, and presenting the advantage of not rebounding at the release.

Figure 7:
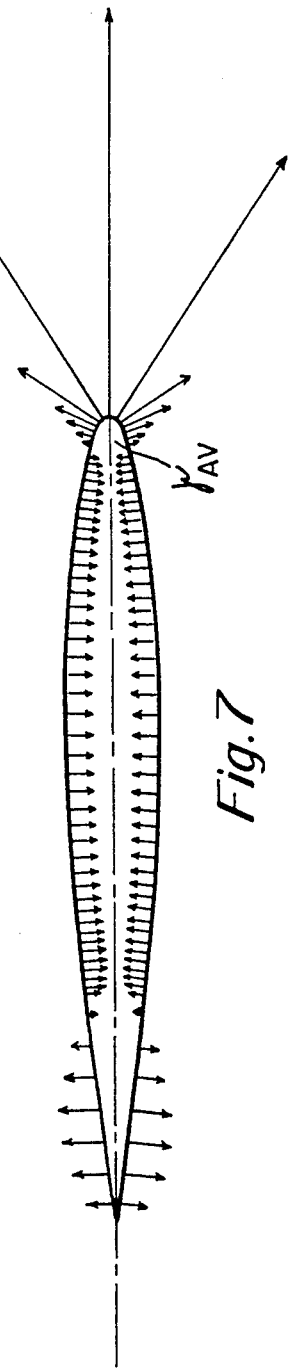
FIG. 7 illustrates Example 2, the case of a hull with a rounded bow portion and a sharply tapered stern portion.

In this case, the solid has the shape presented in FIG. 7 the front part being situated at the right, the profile τAV of which is a conic, while the rear part, located at the left, is sharp following a profile of minimum drag. Like in the present case, the hydrodynamic presures are distributed as indicated by the arrows, so that it is practically constant over the entire joining portion.

Of course, the invention is not limited to the previous examples, or to the particular applications which have been described previously.

Particularly, the calculation algorithm permits applying any pressure law over the joining portion. Thus, the case of a constant pressure is only a particular case, appropriate for a free missile. A different law can be for example used with a motorized missile having a ducted propeller.

We claim:

1. A reduced-drag, axially symmetrical submarine hull having
    a rounded, tapered bow portion (AV);
    a rounded, tapered stern portion (AR); and
    a rounded, central portion joining said bow and stern portions and tapered, for drag minimization, along a curve defined by a Fredholm integral equation of the second kind.

2. A reduced-drag hull according to claim 1, characterized in that
    said Fredholm equation is framed to satisfy the criterion that the pressure coefficient remains constant at all points on the aforesaid central joining portion.

3. A reduced-drag hull according to claim 2, characterized in that
    to reach this constant coefficient, one follows as a profile the natural track lines of the front portion, which are joined to the rear portion.

* * * * *